United States Patent
Hegenbart et al.

(10) Patent No.: US 9,593,989 B2
(45) Date of Patent: Mar. 14, 2017

(54) METHOD AND APPARATUS FOR DETERMINING THE THRUST ON A VEHICLE

(71) Applicant: Airbus Operations GmbH, Hamburg (DE)

(72) Inventors: Matthias Hegenbart, Bliedersdorf (DE); Nabankele-Martial Somda, Hamburg (DE)

(73) Assignee: Airbus Operations GmbH (DE)

( * ) Notice: Subject to any disclaimer, the term of this patent is extended or adjusted under 35 U.S.C. 154(b) by 1002 days.

(21) Appl. No.: 13/658,923

(22) Filed: Oct. 24, 2012

(65) Prior Publication Data

US 2013/0311112 A1    Nov. 21, 2013

Related U.S. Application Data

(60) Provisional application No. 61/551,538, filed on Oct. 26, 2011.

(30) Foreign Application Priority Data

Oct. 26, 2011    (DE) .................. 10 2011 116 975

(51) Int. Cl.
*G01L 1/00*    (2006.01)
*G01L 5/13*    (2006.01)
(Continued)

(52) U.S. Cl.
CPC ............... *G01L 1/00* (2013.01); *G01L 5/133* (2013.01); *B64D 31/00* (2013.01); *B64D 43/00* (2013.01); *B64D 2027/268* (2013.01)

(58) Field of Classification Search
CPC .................. G01L 5/133; B64D 2027/268
See application file for complete search history.

(56) References Cited

U.S. PATENT DOCUMENTS 3,151,306 A * 9/1964 Hines ................... 338/5
4,628,742 A * 12/1986 Golding ............... 73/829
(Continued)

FOREIGN PATENT DOCUMENTS

DE    1120754 B    12/1961
DE    69901529 T2    1/2003
(Continued)

OTHER PUBLICATIONS

NASA, Beginner's Guide to Propulsion: Thrust to Weight Ratio—Answers, http://www.grc.nasa.gov/WWW/K-12/BGP/Donna/t_w_ratio_answers.htm, available online Jul. 29, 2010.*
(Continued)

*Primary Examiner* — Manuel L Barbee
(74) *Attorney, Agent, or Firm* — Lerner, David, Littenberg, Krumholz & Mentlik, LLP (57) ABSTRACT

A method for determining the thrust of at least one engine, which is held on a supporting structure of a vehicle, includes the steps of acquiring the elongation of at least one structural element onto which the thrust of the at least one engine acts, by means of at least one strain gage; calculating the force causing the elongation in the at least one structural element, taking into account the materials characteristics of the structural element; and determining the thrust of the at least one engine as an effective force component in the direction of thrust of the vehicle. It is thus not necessary to carry out an estimate of the thrust on the basis of other physical variables such as shaft speeds, pressure or exhaust gas temperature of engines.

11 Claims, 6 Drawing Sheets

(51) Int. Cl.
    *B64D 31/00*     (2006.01)
    *B64D 43/00*     (2006.01)
    *B64D 27/26*     (2006.01)

(56) References Cited

U.S. PATENT DOCUMENTS

| | | |
|---|---|---|
| 6,141,087 A | 10/2000 | Viel |
| 6,353,793 B1 | 3/2002 | Godwin et al. |
| 7,350,747 B2* | 4/2008 | Machado et al. ............ 244/54 |
| 2010/0250047 A1* | 9/2010 | Balasu et al. ............ 701/29 |

FOREIGN PATENT DOCUMENTS

| | | | |
|---|---|---|---|
| DE | 102006007406 B3 | 6/2007 |
| EP | 1535839 B1 | 7/2006 |
| GB | 673987 A | 6/1952 |
| GB | 966713 A | 8/1964 |

OTHER PUBLICATIONS

Omega, The Strain Gage, http://www.omega.com/literature/transactions/volume3/strain.html, available online Aug. 24, 2011.*
Lambers, Jim, Projections, http://www.math.usm.edu/lambers/mat169/fal109/lecture22.pdf, Oct. 2010.*

* cited by examiner

METHOD AND APPARATUS FOR DETERMINING THE THRUST ON A VEHICLE

CROSS-REFERENCE TO RELATED APPLICATIONS

This application claims the benefit of the filing date of U.S. Provisional Patent Application No. 61/551,538, filed Oct. 26, 2011, the disclosure of which is hereby incorporated herein by reference.

TECHNICAL FIELD

The invention relates to a method and an apparatus for determining the thrust of an engine on a vehicle, and to an aircraft comprising at least one engine and an arrangement for determining the thrust of the at least one engine.

BACKGROUND TO THE INVENTION

At present, the thrust provided by means of engines on an aircraft is not displayed as such in a cockpit. Instead, in the cockpit various measured physical parameters are presented from which a pilot can estimate the corresponding thrust. Depending on the manufacturer of the engine, the parameters may comprise the current pressure ratio, the exhaust temperature, the rotational speed of a low-pressure shaft, the rotational speed of a high-pressure shaft, and the fuel mass flow. It is only with sufficient pilot experience that these values result in an, albeit always somewhat imprecise, estimate of thrust.

GB 673 987 shows a device and a method for determining the thrust of an engine of an aircraft by means of measuring the pressure of a hydraulic system, which pressure depends on the thrust as a result of the engine being coupled to the hydraulic system. However, this device requires substantial modifications of the structure of the aircraft.

SUMMARY OF THE INVENTION

An aspect of the invention proposes as simple as possible a method and as simple as possible an apparatus for determining the thrust of an engine on a vehicle, which method and apparatus, if at all possible, do not require any substantial modifications of the structure of the vehicle itself.

A method for determining the thrust of at least one engine, which is held on a supporting structure of a vehicle, in an advantageous embodiment comprises the following steps. The elongation of at least one structural element that acts on the thrust of the at least one engine is acquired by means of at least one strain gage. The force that causes the elongation in the at least one thrust element is calculated, taking into account the material characteristics of the structural element. The thrust of the at least one engine is determined as a force component of the calculated force in the direction of thrust of the vehicle.

The at least one structural element is any load-bearing or thrust-introducing component onto which the thrust of the engine acts. The structural element may form part of a framework-like, beam-like or profile-carrier-like supporting structure that is used to hold the engine to a vehicle body or fuselage, an aircraft wing or some other elements, or it may be a component arranged between the supporting structure and the engine. From a knowledge of the magnitude and direction of the concrete load introduction into the observed structural element, and thus of the load path between the engine and the observed structural element and the resulting thrust-dependent force component, from the calculated force acting on the structural element it is possible to draw conclusions relating to the total effective thrust.

In this document the term "vehicle" is not to be interpreted as being limiting. While in the present context the vehicle may, in particular, be an aircraft, it may, however, also be a terrestrial vehicle or a water-bound vehicle in which propulsion of the vehicle takes place by the introduction of thrust.

In modern commercial aircraft of substantial size, often suspension of an engine on a corresponding supporting structure is effected in such a manner that aerodynamic forces, mass forces and weight forces in the Y- and Z-directions of the aircraft-fixed coordinate system are taken up by flange-like bearings on the supporting structure. The thrust of the engine, which thrust clearly exceeds the occurring weight forces, mass forces and aerodynamic forces, is introduced into the supporting structure of the aircraft by means of separate thrust elements specifically provided for this. Such thrust elements are frequently designed in a rod-shaped manner and extend from the particular engine to an introduction location on the supporting structure, which introduction location is arranged behind the engine in the X-direction, and above the engine in the Z-direction, when the engine is arranged underneath a wing. The thrust elements, also known as spigots, thus usually extend at an angle to the X-axis of the aircraft. Preferably, for each engine two such thrust elements are used, which are arranged so as to be symmetrical relative to each other, and predominantly extend in a skewed manner to the X-axis of the aircraft. The thrust elements, by their two ends, are predominantly arranged so as to be pivotable both on the engine and on the supporting structure so that when the engine produces thrust, the thrust element is subjected, to the greatest extent possible, purely to tensile load.

Due to the inherent materials characteristics of the thrust element, the load as a result of thrust results in material-dependent and shape-dependent elongation that depends on the axial force to a large extent in a linear manner, which elongation may be measured by means of the at least one strain gage that is to be arranged on the structural element designed as a thrust element. With a knowledge of the materials characteristics, from the predominantly linear dependence of the measured elongation the effective axial force in the thrust element may be calculated. When viewed in a vehicle-fixed coordinate system, the axial force measured in the thrust element may vectorially be composed of several force components that extend parallel to the axes of the vehicle-fixed coordinate system. The amount of projection of the determined axial force vector on the effective axis relevant to thrust corresponds to the thrust of the engine under consideration, which thrust acts on the vehicle. In an ideal case the relevant axis may be the X-axis of the vehicle-fixed (or, in particular, the aircraft-fixed) coordinate system. However, this is not absolutely necessary, for an effective thrust axis can also extend at an angle or in an entirely skewed manner to the X-axis. In such a case component-by-component analysis of the axial force in some other coordinate system, which comprises an axis that coincides with the direction of thrust, would be sensible.

In a manner that differs from the above, as described for example in EP 1 535 839 B1, an engine of an aircraft may also be held to a supporting structure without such thrust elements. In this arrangement only a front flange-like attachment and a rear flange-like attachment in the form of shackles for the insertion of mounting axles are provided.

Such suspension devices transmit thrust predominantly by way of the front, and partly also by way of the rear attachment, and consequently it is sensible to provide all the affected structural elements with wire strain gages. The latter may then make it possible to draw conclusions relating to the deflection of the shackles, from which deflection the force that is acting at that time may be determined. The amount of this determined force in the direction of thrust would then also have to be determined according to the above-mentioned method.

If the structural element is, for example, arranged within the supporting structure, it may form part of a framework or of a framework-like carrier. For the purpose of calculating thrust, in this case, too, the general calculation methods of mechanical engineering may be used. In a framework, individual framework elements or structural elements are primarily subjected to tensile forces and compressive forces so that based on this assumption, for example according to Ritter's method of dissection, a force that depends on an introduced thrust in an observed structural element within the framework may be determined analytically. This implies that by means of a corresponding inverse function it is also possible, by measuring the force in the observed individual structural element, to calculate the overall thrust introduced into the framework or into the framework-like carrier. In the case of other carriers or supporting structures corresponding calculation methods may be used. In the case of complex carriers or supporting structures that do not permit an accurate analytical solution in the determination of thrust from a measured local elongation, generating corresponding characteristic curves by way of an experimental set-up suggests itself, from which characteristic curves by way of the elongation determined it is possible to directly determine the respective thrust.

This method according to an aspect of the invention is associated with an advantage in that for determining thrust it is not necessary to use all the physical variables that are furnished during operation of the vehicle by the at least one engine. With the use of the thrust calculated, it is possible to directly and accurately display to a pilot in the cockpit the actually occurring thrust.

All the designs of wire strain gages may be used that are available at present. Apart from purely resistance-based metallic strain gages, in which a change in elongation results in a change in resistance, piezo-resistive strain gages are also known, whose specific resistance changes if there is a change in volume. Normally, a strain gage is bonded to the object to be monitored. The mechanical characteristics, in particular the elasticity and the creep characteristics of the adhesive, need to correspondingly be taken into account when determining the respective elongation.

It is understood that apart from the electronic circuit of the at least one strain gage, for example in the form of a resistive bridge circuit, corresponding devices for evaluating the acquired elongations should be present, which devices may effectively suppress measurement noise or other artifacts so that sensible determination of values takes place. For example, reference is made to the Kalman filter, which is, in particular, known from inertial measurement devices.

In an advantageous embodiment the at least one structural element is selected from a group of structural elements, wherein the group comprises an elongated thrust element (spigot), by way of which the at least one engine introduces the thrust into the supporting structure, a flange for affixing an elongated thrust element, part of a supporting structure, a front suspension means, and a rear suspension means. The suspension means can, for example, be implemented as shackles. This group of structural elements does not constitute an exhaustive limiting list, but is to be regarded merely as an indication that all imaginable suspension means and/or thrust introduction means for engines may be equipped with strain gages in order to be able to determine thrust by means of a method according to an aspect of the invention.

Furthermore, it is imaginable, as stated in the introduction, to connect the at least one engine with several structural elements, for example thrust elements. In an advantageous embodiment, acquiring the elongation of the at least one structural element thus involves acquiring the elongations of several structural elements connected to the respective engine. Calculating the axial forces that cause the elongation may accordingly also involve calculating all the axial forces relating to all the thrust elements of an engine, calculating all the forces acting on all the shackle-like retaining means, or calculating all the forces acting on a multitude of structural elements within a supporting structure for the engine. By means of a multitude of measuring results the precision of the method may be improved so as to avoid having to draw conclusions, from a single reading on an engine, in relation to other symmetrical measuring locations, because this does not necessarily lead to a correct result.

Vehicles, and in particular commercial aircraft of a considerable size, predominantly comprise several engines and consequently in an advantageous embodiment determining the thrust involves the addition of the determined thrust values of all the engines. Equipping a single structural element on an engine or on an associated supporting structure with strain gages may only make it possible to determine the force acting in that location, and consequently in each case only the thrust of the particular engine may be determined.

In an advantageous embodiment, acquiring the elongation of the at least one structural element involves measuring several elongation values on the same structural element by means of a group of strain gages, and averaging the individual elongation values. If a single strain gage is used on a structural element, a situation cannot be excluded in which the bond between the wire strain gage and the monitored object becomes undone or the strain gage is mechanically damaged. If several strain gages are used, the danger of basing a thrust calculation on incorrect elongation values may be reduced. Averaging may, for example, involve the formation of an arithmetic average or a time-weighted average.

In a further advantageous embodiment, determining the elongation of the at least one structural element may involve measuring several elongation values at various locations of the structural element, wherein the individual elongation values are subjected to a plausibility check, and the elongation values that in this process are determined to be plausible are averaged. The plausibility check is to be understood as a rough check as to whether a measured value falls within a predetermined usual value range or whether several elongation values, determined in parallel, of the same structural element clearly differ from each other or in the case of temporal observation show clear discontinuities. With the use of three or four strain gages it is easy to determine whether a strain gage furnishes continuous measurement values that significantly differ from the measurement values of other strain gages. If, for example, the bond between a strain gage and the associated structural element is undone, the elongation value of interest may always be close to 0, while the measurement values of the other strain gages are always other than 0 and among them show approximately the same order of magnitude. With the use of an adequate number of strain gages, it would be possible to carry out determination of measurement values of an already selected number of strain gages with plausible measurement values. In addition to the plausibility check, on the basis of the usual physical variables of the engine under consideration an estimate of a present thrust may be carried out, by means of which estimate subsequently the thrust calculated on the basis of the determined elongations may be compared. Such a plausibility check may be carried out by an electronics unit that is either already used for measuring and evaluating the elongation values, or that is conceived as an additional, separate, device for this task. The plausibility check may in addition also compare all the determined elongation values among themselves in order to detect whether the difference in the values among themselves exceeds a defined threshold value.

The apparatus for determining the thrust of at least one engine that is held on a supporting structure of a vehicle comprises at least one strain gage for acquiring the elongation of at least one structural element and an electronics unit, wherein the electronics unit is connected to the at least one strain gage and is equipped to acquire the elongation of a structural element, which elongation has been acquired by the at least one strain gage, and to calculate the force causing the determined elongation of the structural element monitored by the at least one strain gage, taking into account the materials characteristics of the structural element.

In an advantageous embodiment the electronics unit is adapted for acquiring elongations from at least one group with several strain gages, and to average the acquired elongations of a group.

In a further advantageous embodiment the electronics unit is adapted for acquiring elongations from at least one group with several wire strain gages and by comparing the acquired elongations with a predetermined value range to check the plausibility of the acquired elongations.

The invention furthermore relates to a vehicle that comprises at least one engine and at least one supporting structure, wherein the engine is held on the supporting structure. A structural element comprises at least one strain gage that is connected to an electronics unit. The electronics unit is equipped, from a signal of the at least one strain gage, to determine the elongation of the structural element, from it to calculate the force causing the elongation in the at least one structural element, taking into account the materials characteristics of the structural element, and from the determined force to determine the thrust of the at least one engine as a force component in the direction of thrust of the vehicle.

The vehicle thus always allows a precise statement relating to the thrust present at a given time, without there being a need to engage in estimates with reference to other physical variables.

BRIEF DESCRIPTION OF THE DRAWINGS

Further characteristics, advantages and application options of the invention are disclosed in the following description of the exemplary embodiments and of the figures. All the described and/or illustrated characteristics per se and in any combination form the subject of the invention, even irrespective of their composition in the individual claims and their interrelationships. Furthermore, identical or similar components in the figures have the same reference characters.

DETAILED DESCRIPTION

Figure 1:
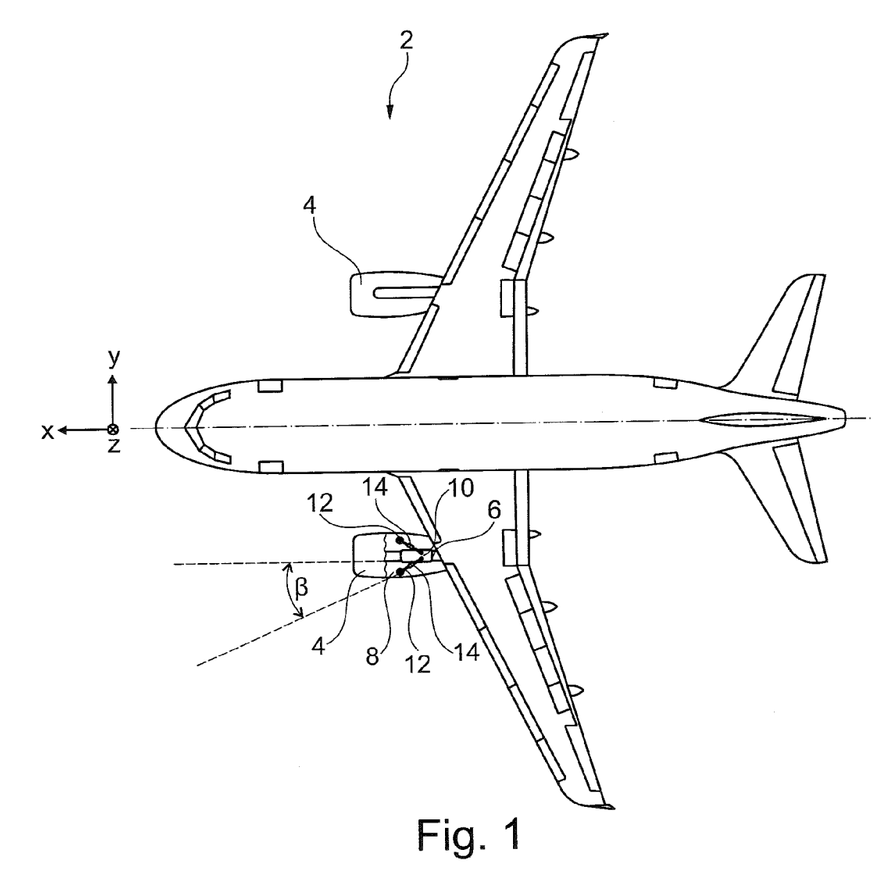
FIG. 1 shows a diagrammatic view of an aircraft according to an embodiment of the invention.

FIG. 1 shows a top view of an aircraft 2 that comprises two engines 4. Each of these engines 4 is arranged on a supporting structure 6 of the aircraft, which supporting structure 6 comprises two punctiform or flange-like bearings 8 and 10 as well as thrust elements 12. Each engine 4 generates thrust, which manifests itself as a tensile force on the supporting structure 6. The effective direction of the thrust may coincide with the longitudinal axis X of an aircraft-fixed coordinate system (for example according to DIN 9300). The thrust elements 12 are arranged in such a manner that the engines 4 exclusively or to a very large extent introduce their thrust by way of the thrust elements 12 into the structure of the aircraft 2. Due to a non-rigid connection of the thrust elements 12 on the supporting structure 6 the thrust elements are practically exclusively subjected to tensile force.

On each thrust element 12 at least one strain gage 14 is arranged that acquires the elongation of the respective thrust element 12. With a knowledge of the materials characteristics and of the cross section of the thrust elements 12 in this manner the tensile force within the respective thrust element 12, which tensile force correlates to the elongation, may be calculated. By projecting a force vector, whose direction is determined by the spatial position of the respective thrust element 12 and whose length or amount is known as a result of the measured tensile force, onto the thrust direction observed the thrust vector associated with the respective thrust element 12 is formed. The length or amount of said thrust vector is a measure of the thrust that is introduced into the supporting structure 6 by way of the respective thrust element 12.

As an example, two thrust elements 12 for each engine 4 are shown, and consequently the entire thrust of an engine 4 is determined from the addition of the thrust introduced by the two thrust elements 12.

Figure 2A:
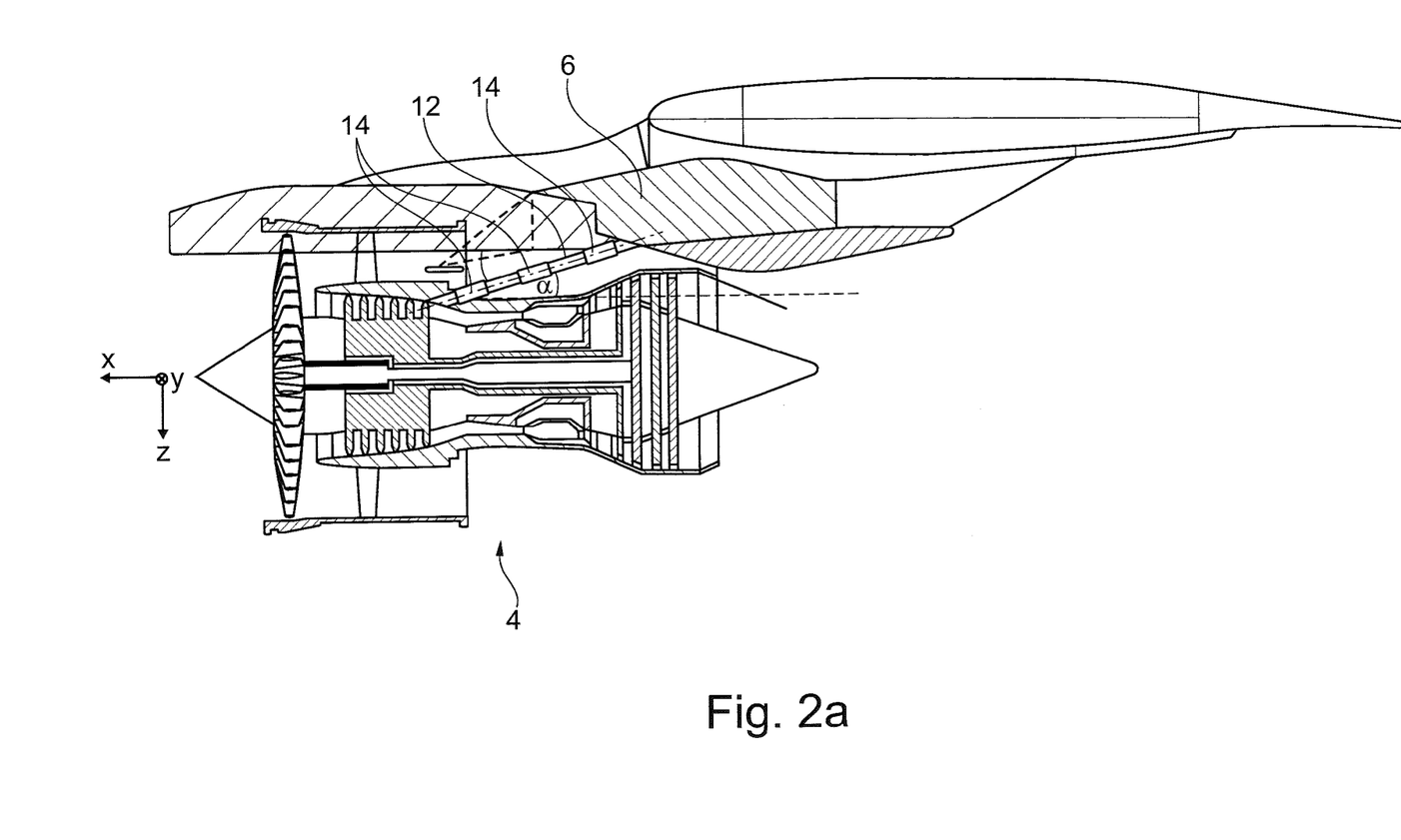
FIGS. 2a and 2b show a lateral section view and a diagrammatic top view, respectively, of an engine suspension with thrust elements and wire strain gages arranged thereon, according to an embodiment of the invention.
Figure 2B:
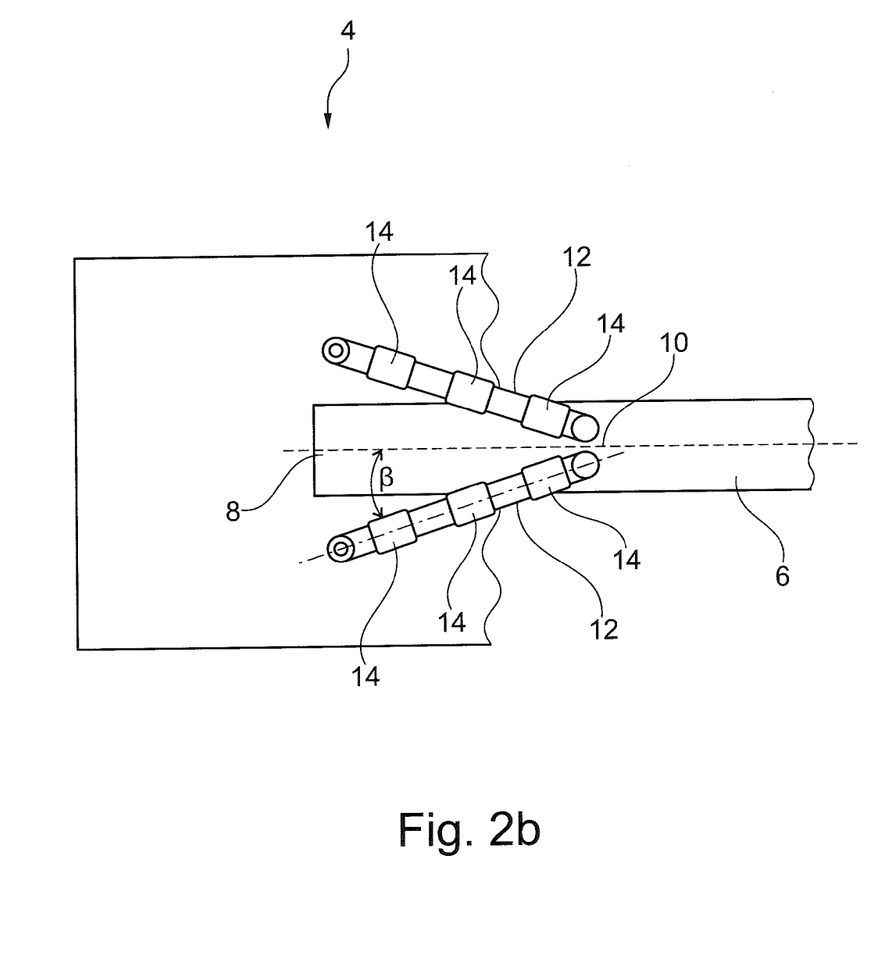

FIG. 2a and FIG. 2b in a lateral section view (FIG. 2a) and in a diagrammatic top view (FIG. 2b) show the arrangement of an engine 4 on a supporting structure 6, wherein for the purpose of introducing thrust into the supporting structure two thrust elements 12 are used. The diagrams show the arrangement of, for example, a total of three strain gages 14 along the length of the thrust elements 12, with each strain gage 14 itself being able to detect the local elongation. Preferably, all the strain gages 14 are bonded onto the thrust element 12, thus precisely following its elastic elongation movement.

As an example, on the Y-axis the thrust elements 12 are offset by an angle $\alpha$ situated in the X-Z-plane, and on the Z-axis are offset by an angle $\beta$ situated in the X-Y-plane. Under the assumption that the thrust of the engine 4 is fully introduced into the supporting structure 6 by the two thrust elements 12, said thrust may be calculated by calculating the axial forces within the thrust elements 12. If the X-axis of the aircraft-fixed coordinate system is decisive as the direction of thrust, in this simple case the thrust corresponds to the sum of the determined axial forces multiplied by $\cos(\alpha)$ and $\cos(\beta)$.

In order to improve the accuracy and reliability, measuring the axial force in the thrust elements 12 is carried out by means of several strain gages 14 that are distributed on the respective thrust element 12. The elongation values determined may be subjected to a plausibility check and/or may be averaged.

Figure 3:
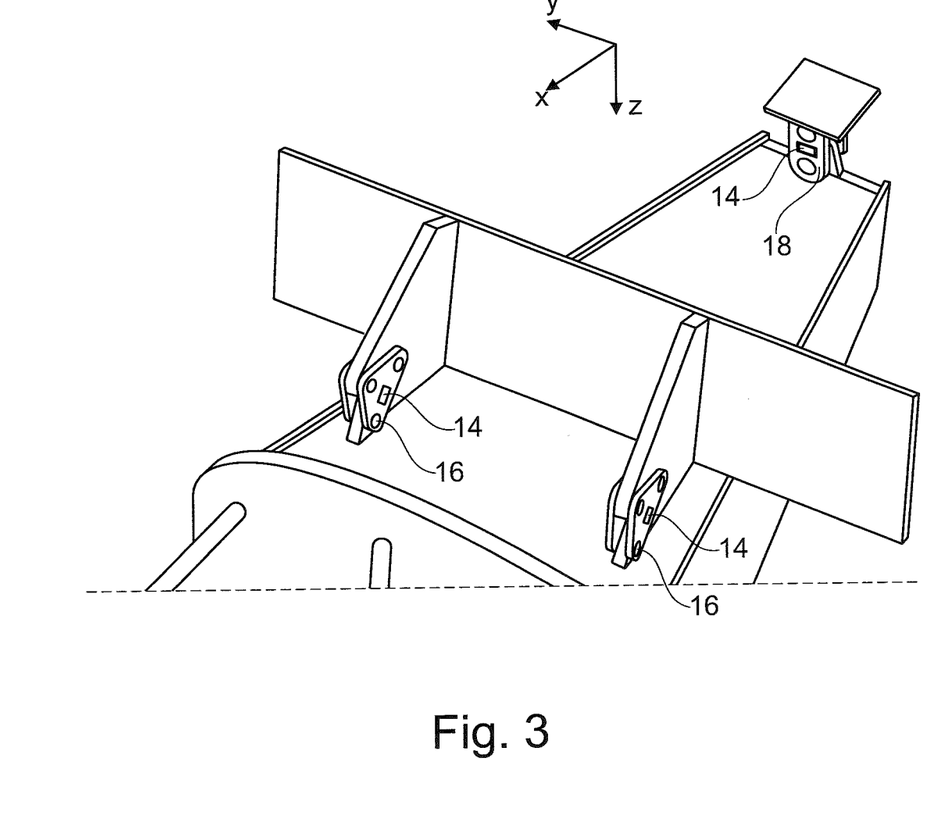
FIG. 3 shows a detailed view of an alternative engine suspension with shackles and wire strain gages arranged thereon.

FIG. 3 shows an alternative flange-like suspension device based on the illustration in EP 1 535 839 B1 for an engine, in which two triangular shackles 16 are used as front suspension means, which shackles 16 are somewhat rotated on the Z-axis on a horizontal plane. The shackles 16 are to be considered to be structural elements subjected to a force, which shackles 16 comprise strain gages 14 in order to detect their elongation. In order to provide a rear suspension means, a further shackle 18 may be used which, while it might be subjected only insignificantly to thrust, nevertheless may comprise a further strain gage so that from the totality of all three shackles 16 and 18 the effective thrust of the respective engine is determined.

Figure 4:
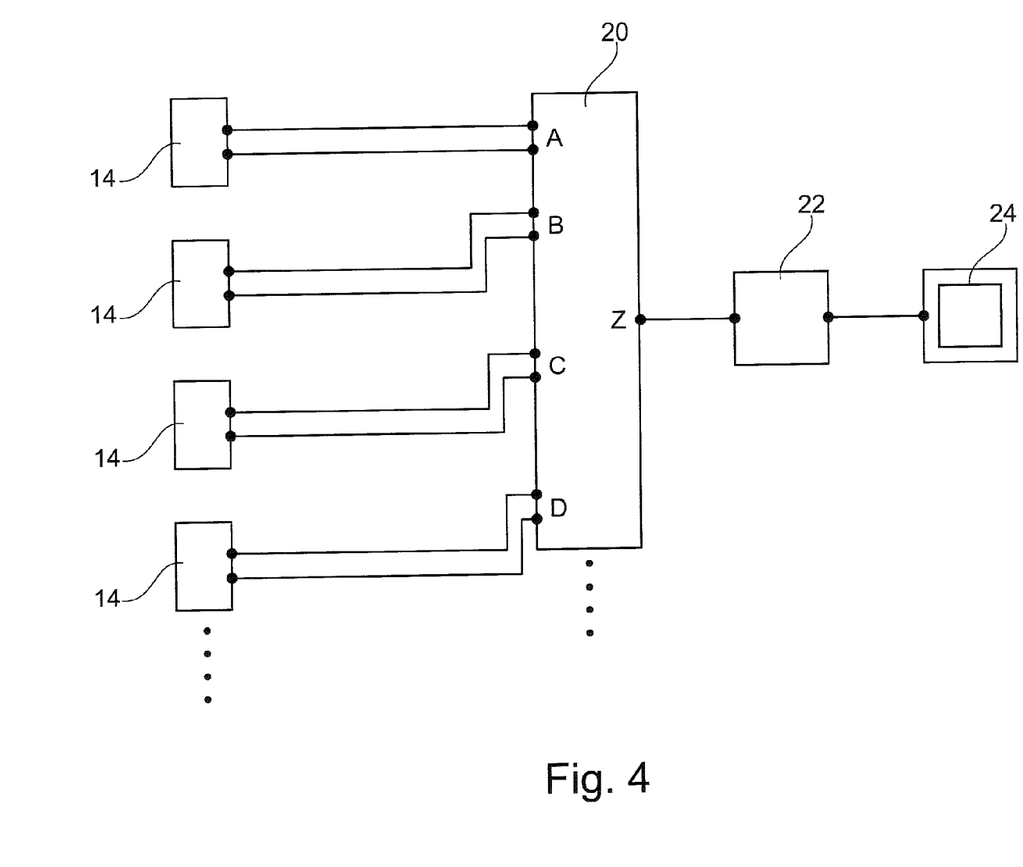
FIG. 4 shows a diagrammatic view of an apparatus for determining the thrust of an engine of a vehicle.

According to FIG. 4 an apparatus for determining the thrust of at least one engine that is held on a supporting structure of a vehicle may comprise a number of wire strain gages 14 that are connected to one or several electronics units 22. For example, an amplifier unit 20 is used for electrically connecting the more or less numerous wire strain gages 14 at the input ports A, B, C, D, etc. in order to provide an evaluable analog or digital signal at an output port Z to which the electronics unit 22 is connected. For each wire strain gage, for example of the metallic type, the amplifier unit 20 may comprise a corresponding bridge circuit, e.g. a Wheatstone bridge circuit, and can provide a stable bridge feed voltage. In order to measure the finest changes in resistance, the achieved differential voltages within the measuring points in the bridge circuits may be amplified to such an extent that they are in a suitable voltage range for a measurement transducer integrated within the electronics unit 22 or within the amplifier unit 20.

The electronics unit 22 is adapted for determining electric state variables of the strain gages 14, from which a conclusion relating to the respective elongation is made possible, to which elongation the wire strain gages 14 are subjected. In addition, the electronics unit 22 is adapted, from the detected elongation, for determining the respective force within the respective associated structural element 12, 16, 18. Taking into account the load path between the engine and the structural element 12, 16, 18 under consideration, and the thrust-dependent force component resulting thereof, from the calculated force acting on the structural element 12, 16, 18 conclusions relating to the thrust can be drawn. To this effect the electronics unit 22 may either provide an analytical mechanical solution that is, for example, an inverse function of the force determination in a structural element 12, 16, 18 based on the introduced thrust, or is based on experimentally determined characteristic curves. Lastly, the electronics unit 22 is adapted for outputting the respective thrust, determined in relation to an engine 4, in the desired spatial direction of thrust.

In order to display the thrust values the electronics unit 22 transmits this information to a display unit 24 that may either be of a separate design or form part of an overarching vehicle system, for example the flight management system. The display may use a commonly used unit of measurement, for example kN or similar.

The electronics unit 22 is furthermore able to check the plausibility of measured elongation values. To this effect the measured elongation values of an individual structural element are compared to each other and/or to a predetermined value range. If the difference between one of the measured elongation values and other elongation values exceeds a predetermined threshold value, it may be concluded that this measured value is not plausible, and that, for example, an associated wire strain gage 14 or one of the input ports A, B, C, D, . . . , an amplifier circuit or other device is defective. If a measurement value is generally far outside a usual, predetermined, value range, it may also be concluded that this value is not plausible. The electronics unit 22 may, furthermore, be equipped, with reference to other physical variables of an engine 4, for example the pressure, shaft speeds or the exhaust gas temperature, to estimate a thrust value relating to the respective engine 4, and with this estimate carry out a rough comparison with measured elongation values. The electronics unit 22 is furthermore able to average all the plausible measured values in order to obtain as accurate a value as possible relating to the elongation of the particular structural element 16, 18, 20.

The strain gages 14 may belong to different engines. Accordingly, the electronics unit 22 is adapted for adding the individual, determined, thrust values for each engine 4 in order to, finally, determine the total thrust of the vehicle.

Figure 5:
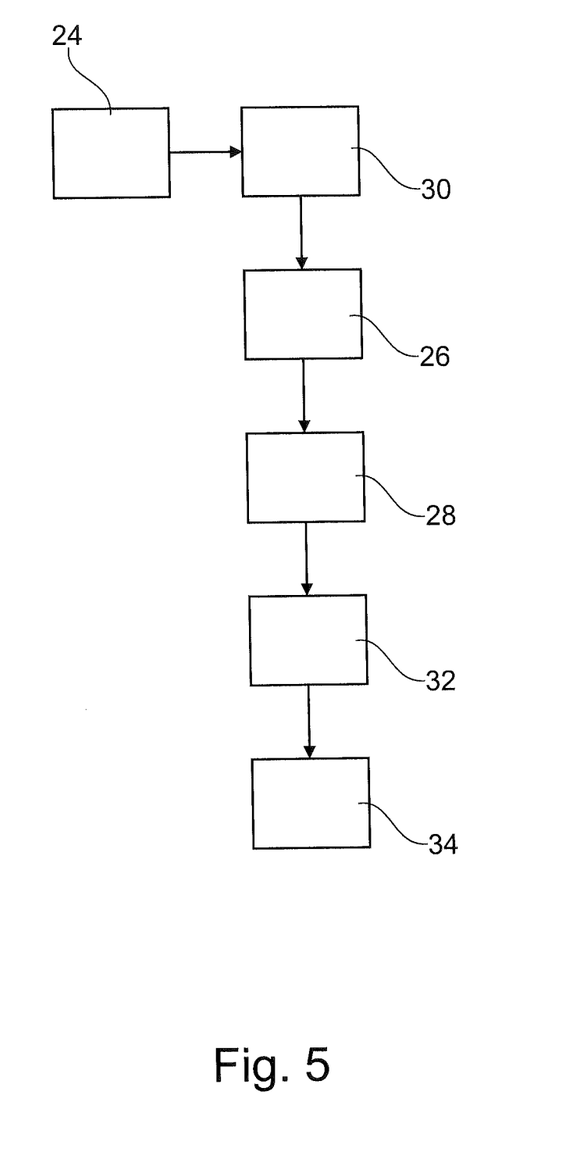
FIG. 5 shows an exemplary embodiment of a method according to an aspect of the invention.

A method according to an aspect of the invention may, as shown in FIG. 5, for example comprise the method-related steps of acquiring 24 the elongation of at least one structural element by means of at least one strain gage; of calculating 26 the force, which causes the elongation, in the at least one structural element, taking into consideration the materials characteristics of the structural element; and determining 28 the thrust of the at least one engine as a force component of the calculated force in the direction of thrust of the vehicle. Prior to the use of the measure elongation values a plausibility check may be carried out 30, which plausibility check comprises a comparison of the measurement values with predetermined value ranges, and/or a comparison with other measurement values on the same structural element. Finally, all the determined thrust components may be added 32 and displayed 34.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A method for determining a thrust of at least one engine held on a supporting structure of a vehicle, the method comprising:
   arranging at least one strain gage on at least one structural element, onto which the thrust of the at least one engine acts, of the supporting structure;
   acquiring, by the at least one strain gage, an elongation of the at least one structural element;
   calculating, by an electronics unit, the force causing the elongation in the at least one structural element, taking into account the materials characteristics of the at least one structural element; and
   determining, by the electronics unit, the thrust of the at least one engine as an effective force component in a predetermined direction of thrust of the vehicle.

2. The method of claim 1, wherein the at least one structural element is selected from a group of structural elements, the group consisting of:
   an elongated thrust element by way of which the at least one engine introduces the thrust into the supporting structure,
   a part of the supporting structure,
   a flange for mounting an elongated thrust element,
   a front suspension means of an engine, and
   a rear suspension means of an engine.

3. The method of claim 1, comprising the acquisition of the elongations of a plurality of structural elements.

4. The method of claim 1, further comprising determining the thrust of a plurality of engines of the vehicle as an addition of determined thrust values of individual engines.

5. The method of claim 1, wherein acquiring the elongation of the at least one structural element involves acquiring a plurality of elongation values on the same structural element by a group of strain gages, and averaging the individual elongation values acquired.

6. The method of claim 5, further comprising checking the plausibility of the measured elongation values.

7. An apparatus for determining the thrust of at least one engine, the apparatus comprising:
   a supporting structure for holding the at least one engine;
   at least one strain gage for acquiring an elongation of at least one structural element of the supporting structure; and
   an electronics unit connected to the at least one strain gage and adapted for recording the elongation acquired by the at least one strain gage, for calculating the force causing the determined elongation of the structural element monitored by the at least one strain gage, taking into account the materials characteristics of the structural element, and for determining the thrust of the at least one engine as an effective force component in a predetermined direction of thrust of the vehicle.

8. The apparatus of claim 7, wherein the electronics unit is adapted for acquiring elongations of at least one group of a plurality of strain gages, and for averaging the acquired elongations of a group.

9. The apparatus of claim 7, wherein the electronics unit is adapted for acquiring elongations from at least one group of a plurality of strain gages, and by comparing the acquired elongations with a predetermined value range for checking the plausibility of the acquired elongations.

10. A vehicle comprising:
    at least one engine held on a supporting structure of the vehicle, and
    at least one apparatus for determining the thrust of the at least one engine, the at least one apparatus comprising:
    at least one strain gage for acquiring the elongation of at least one structural element;
    an electronics unit connected to the at least one strain gage and adapted for recording the elongation acquired by the at least one strain gage, for calculating the force causing the determined elongation of a structural element monitored by the at least one strain gage, taking into account the materials characteristics of the structural element, and for determining the thrust of the at least one engine as an effective force component in a predetermined direction of thrust of the vehicle.

11. The vehicle of claim 10, further comprising a display unit for displaying the determined thrust.

\* \* \* \* \*